US008364508B2

(12) United States Patent
Farina et al.

(10) Patent No.: US 8,364,508 B2
(45) Date of Patent: Jan. 29, 2013

(54) INTERACTIVE ACTIVITY MANAGEMENT SYSTEM AND METHOD

(75) Inventors: Robert Joseph Farina, Toluca Lake, CA (US); Jonathan Lester Simon, Culver City, CA (US); Alexander L. Voltz, Los Angeles, CA (US); David Ngo, S. San Gabriel, CA (US)

(73) Assignee: The Cimarron Group, Hollywood, CA (US)

( * ) Notice: Subject to any disclaimer, the term of this patent is extended or adjusted under 35 U.S.C. 154(b) by 166 days.

(21) Appl. No.: 13/028,182

(22) Filed: Feb. 15, 2011

(65) Prior Publication Data

US 2012/0041793 A1   Feb. 16, 2012

Related U.S. Application Data

(60) Provisional application No. 61/338,304, filed on Feb. 16, 2010.

(51) Int. Cl.
*G06Q 50/00*   (2012.01)
*G06Q 10/00*   (2012.01)
*G06F 3/048*   (2006.01)

(52) U.S. Cl. ............... 705/5; 705/6; 705/15; 705/346; 715/810; 715/813

(58) Field of Classification Search ............... 715/781, 715/963, 810, 813, 809; 705/5, 6, 15, 346, 705/7.12, 7.13, 7.15–7.26, 21, 22, 26.1–30, 705/300, 301, 304, 319, 320, 1.1
See application file for complete search history.

(56) References Cited

U.S. PATENT DOCUMENTS

| 7,788,598 | B2* | 8/2010 | Bansal et al. ............... 715/810 |
| 7,945,477 | B2* | 5/2011 | Werbitt ........................ 705/15 |
| 8,074,175 | B2* | 12/2011 | Brush et al. ................. 715/751 |
| 8,161,419 | B2* | 4/2012 | Palahnuk et al. ............ 715/781 |
| 8,249,906 | B2* | 8/2012 | Ponce de Leon ........... 705/7.18 |
| 2002/0147647 | A1* | 10/2002 | Ragsdale-Elliott et al. .... 705/15 |
| 2008/0201227 | A1* | 8/2008 | Bakewell et al. ............. 705/14 |
| 2009/0158200 | A1* | 6/2009 | Palahnuk et al. ............ 715/781 |
| 2009/0313299 | A1* | 12/2009 | Bonev et al. .............. 707/103 R |

* cited by examiner

*Primary Examiner* — Igor Borissov
(74) *Attorney, Agent, or Firm* — Lewis Brisbois Bisgaard & Smith LLP; Jon Hokanson

(57) ABSTRACT

Systems and methods for defining, booking and managing activities or services by a user of digital computer implemented applications and interactive displays based on time, location and theme as related to the user's local environment.

16 Claims, 20 Drawing Sheets

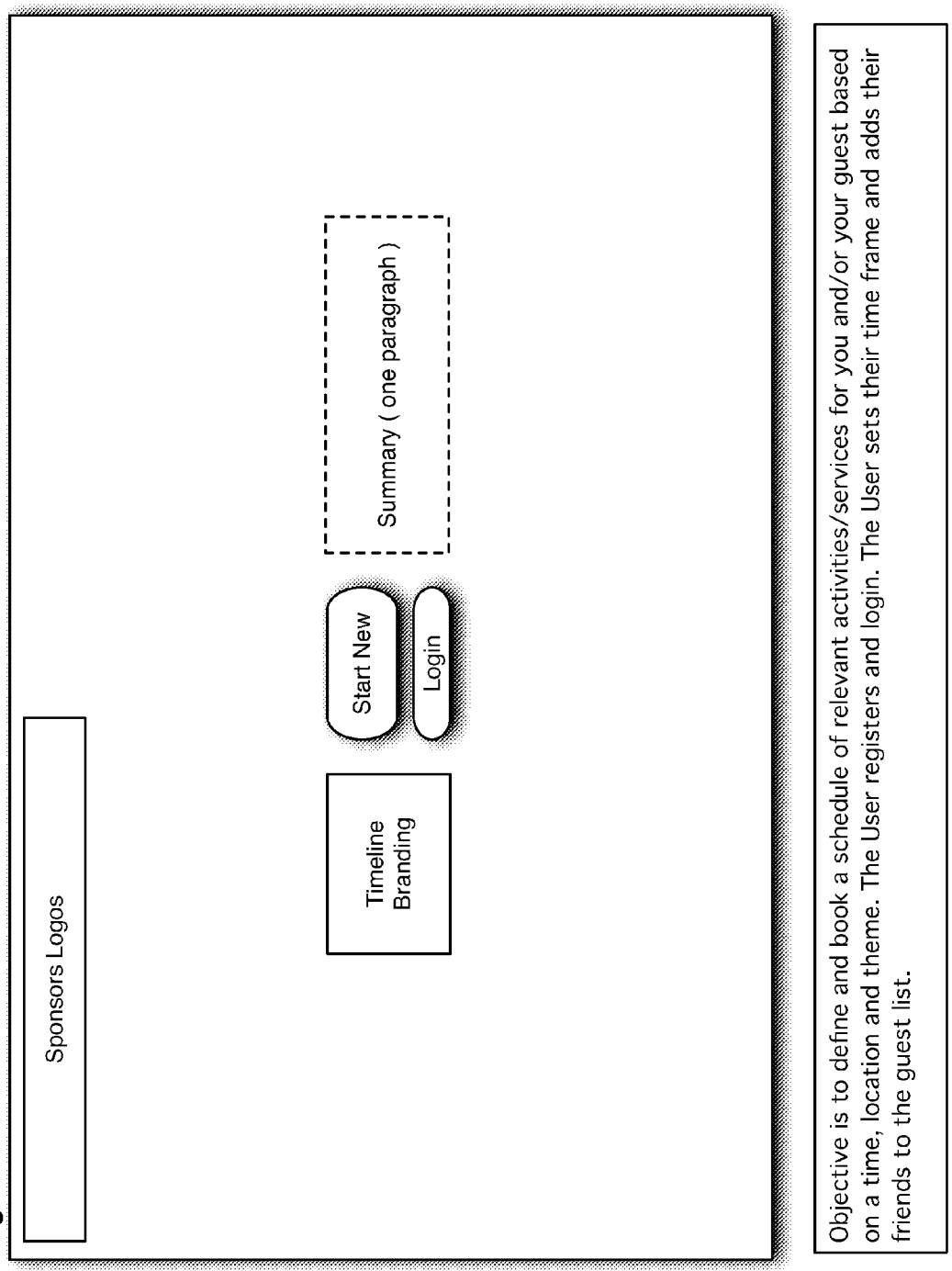
Figure 8. User Module: Start

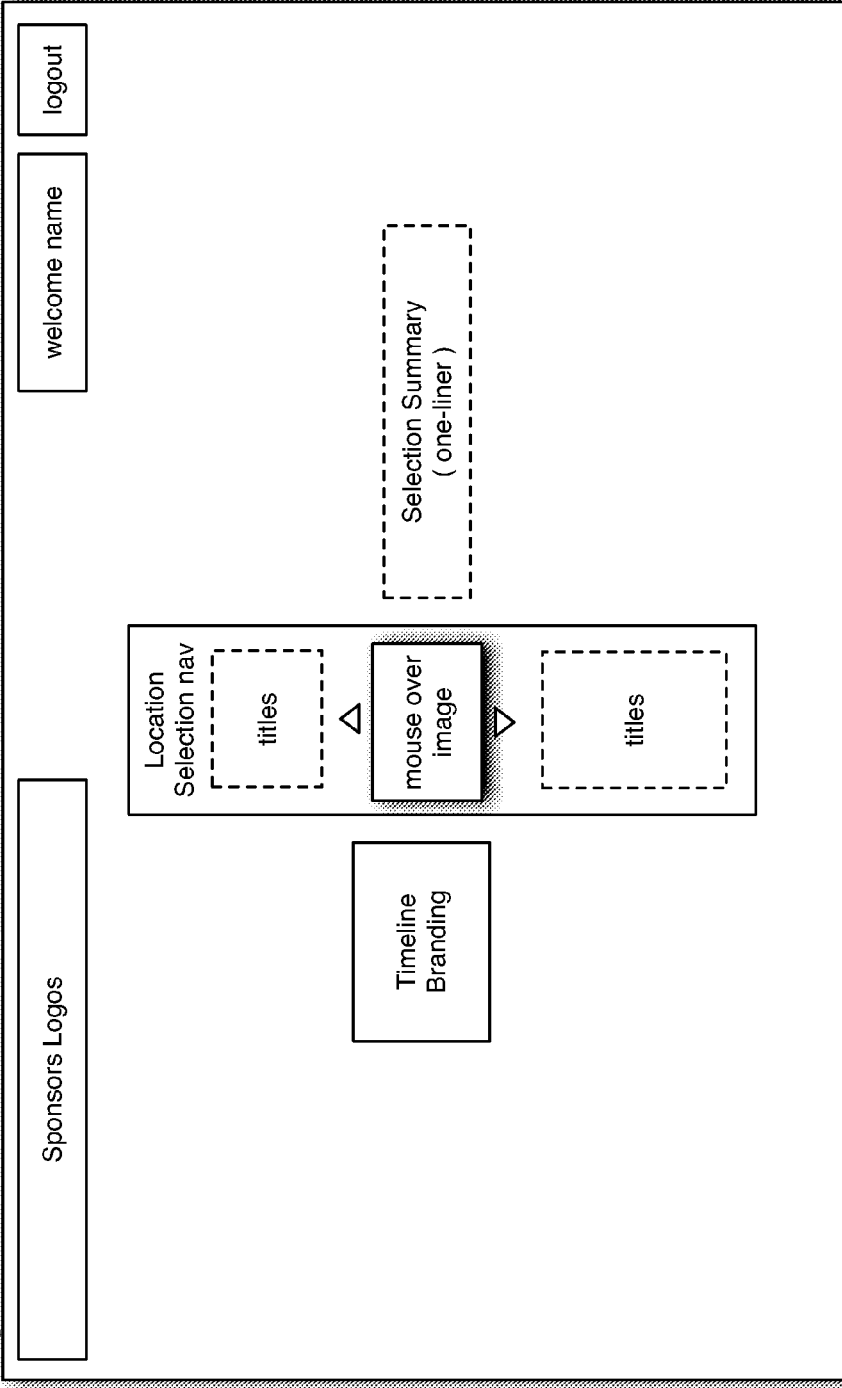
Figure 9. Recommendation Module:Location

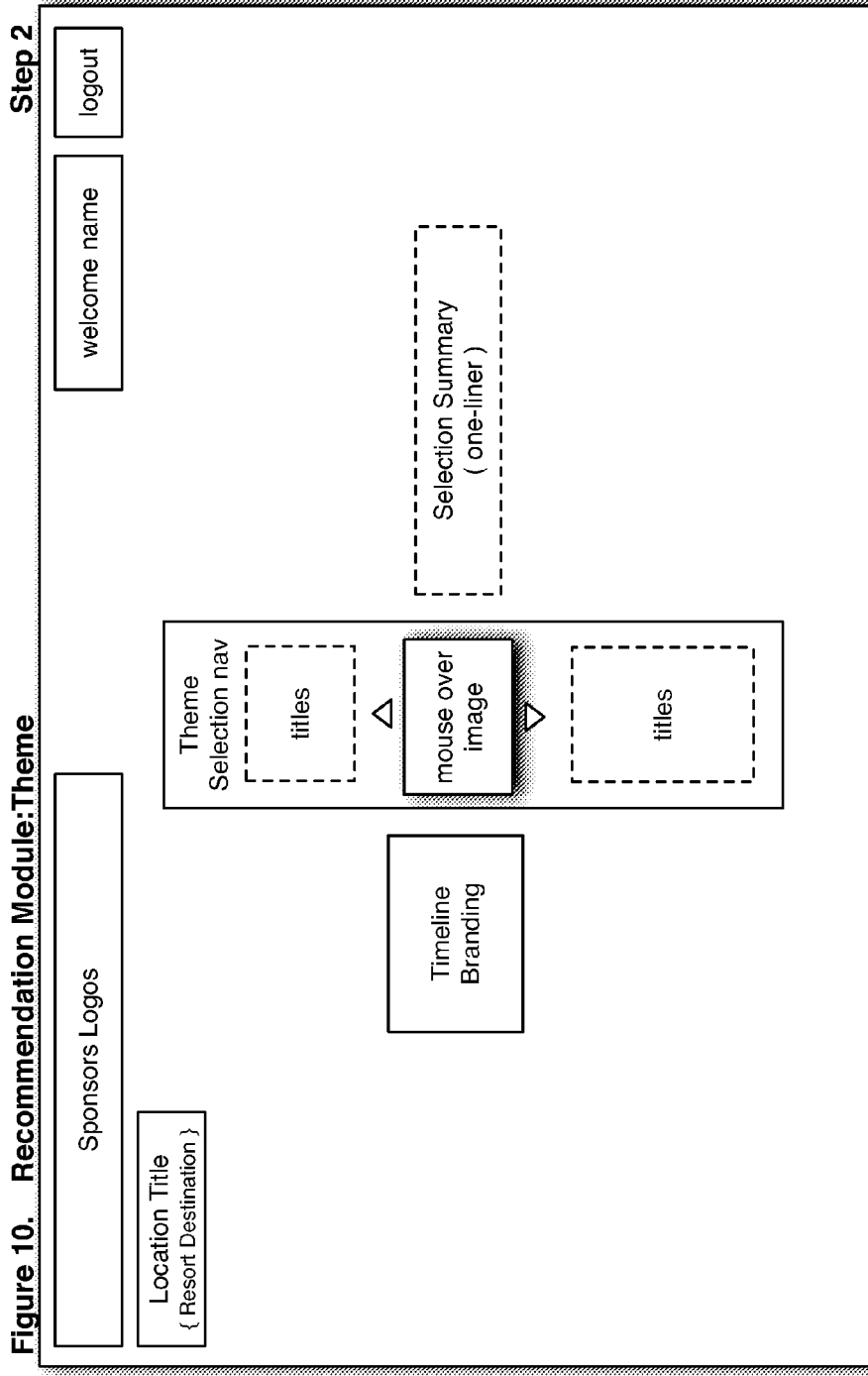

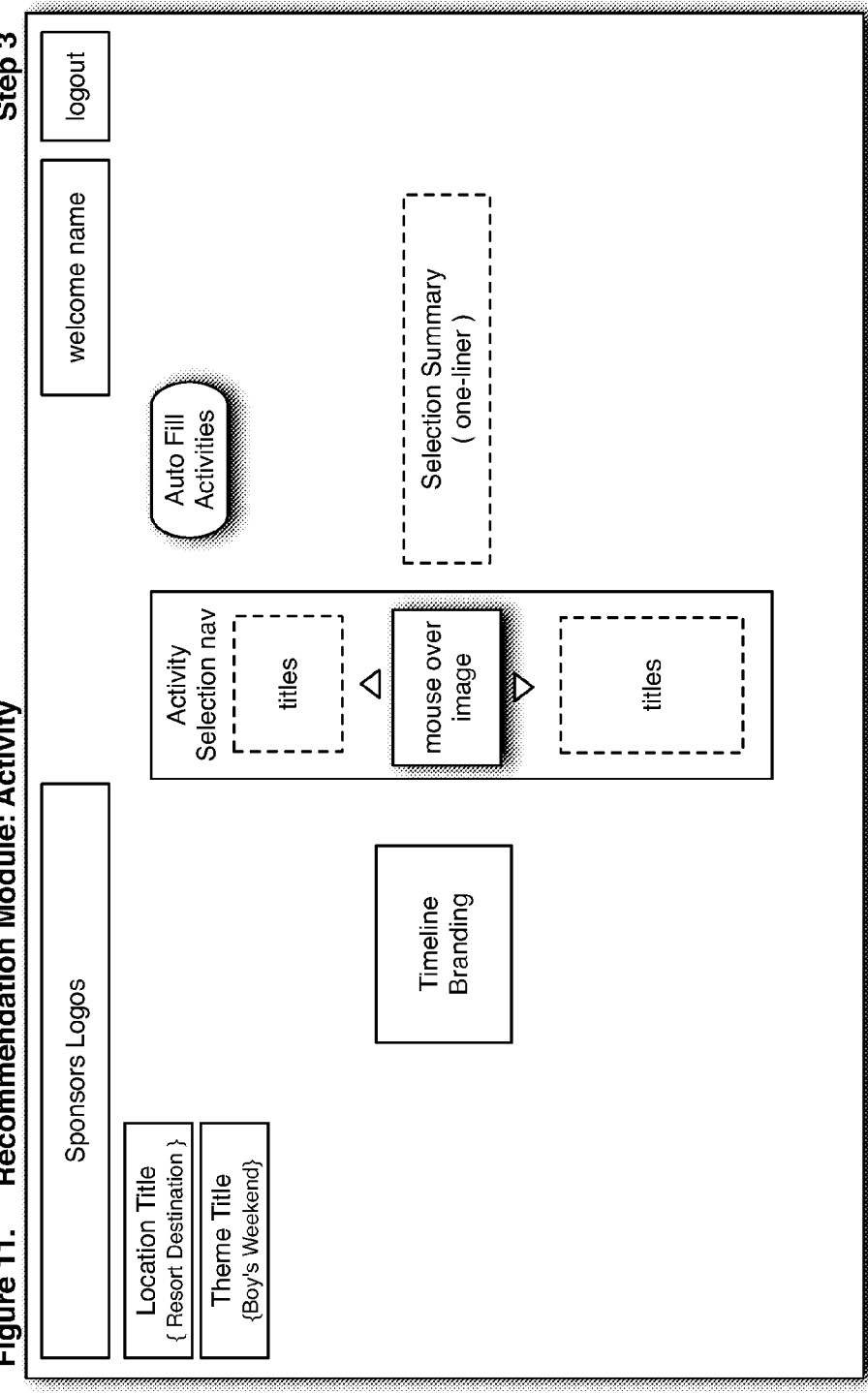

Figure 11. Recommendation Module: Activity

User selects "Eat" from the Activity selection navigation. The selected Activity is saved and added to the Visual Navigation Bar. Next, the Category selection navigation transitions in. If the User clicks Auto Fill Activities the User's timeline schedule is populated with prepackaged activities Activity examples: Watch, Dance, Gamble, Relax, Eat, Drink, Play, Shop, Swim, Tour, Nap

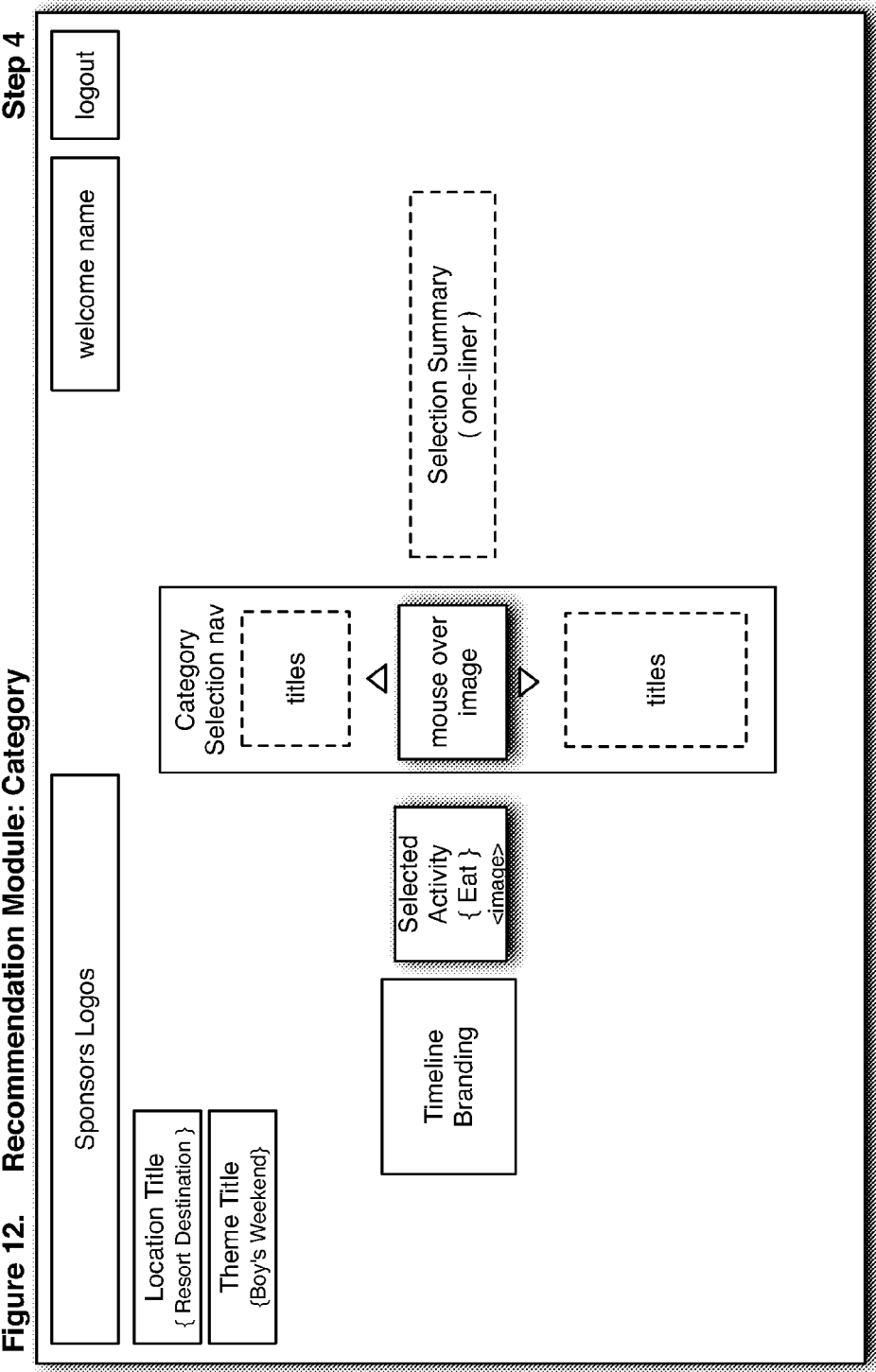
Figure 12. Recommendation Module: Category

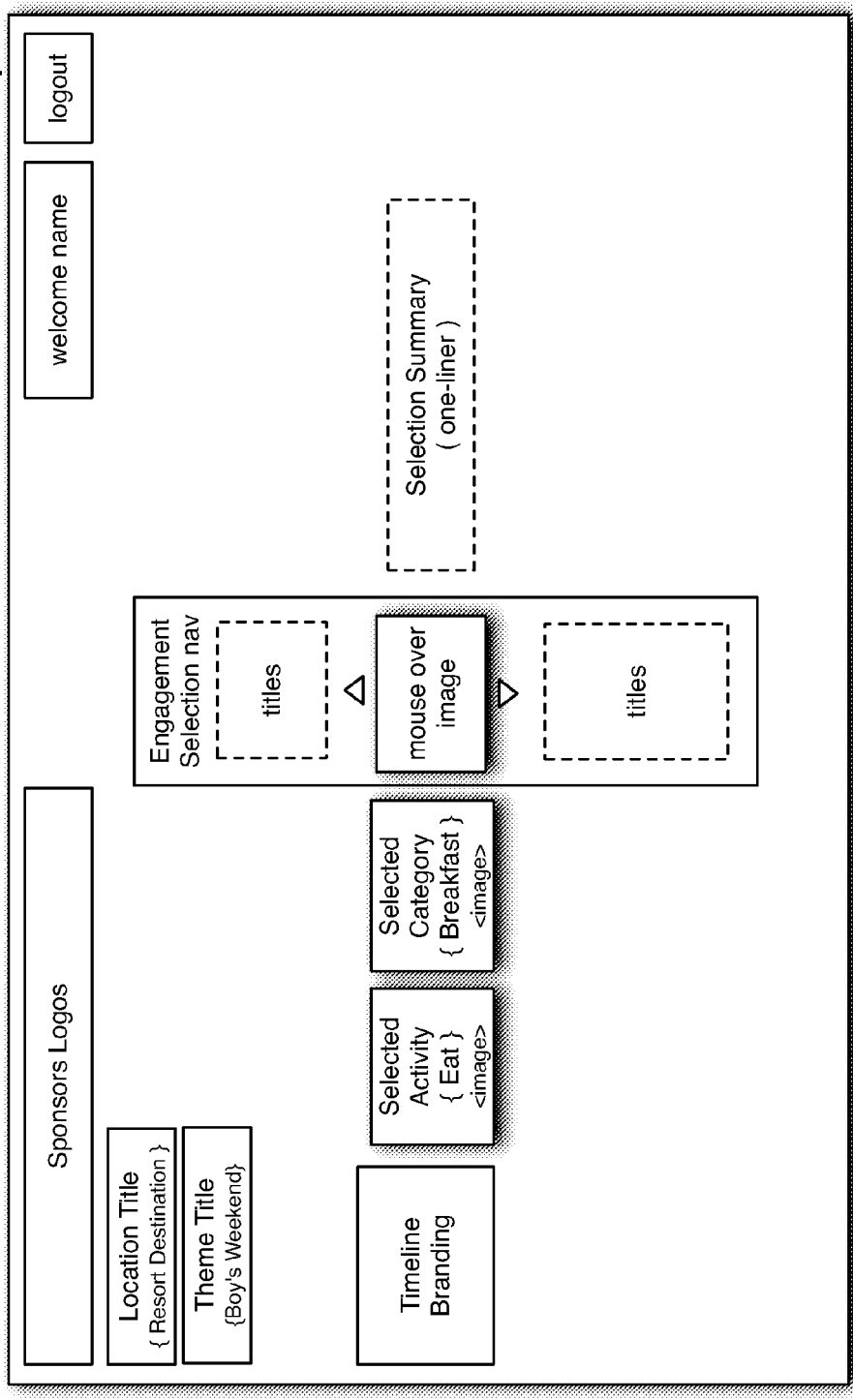
Figure 13. Recommendation Module: Engagement

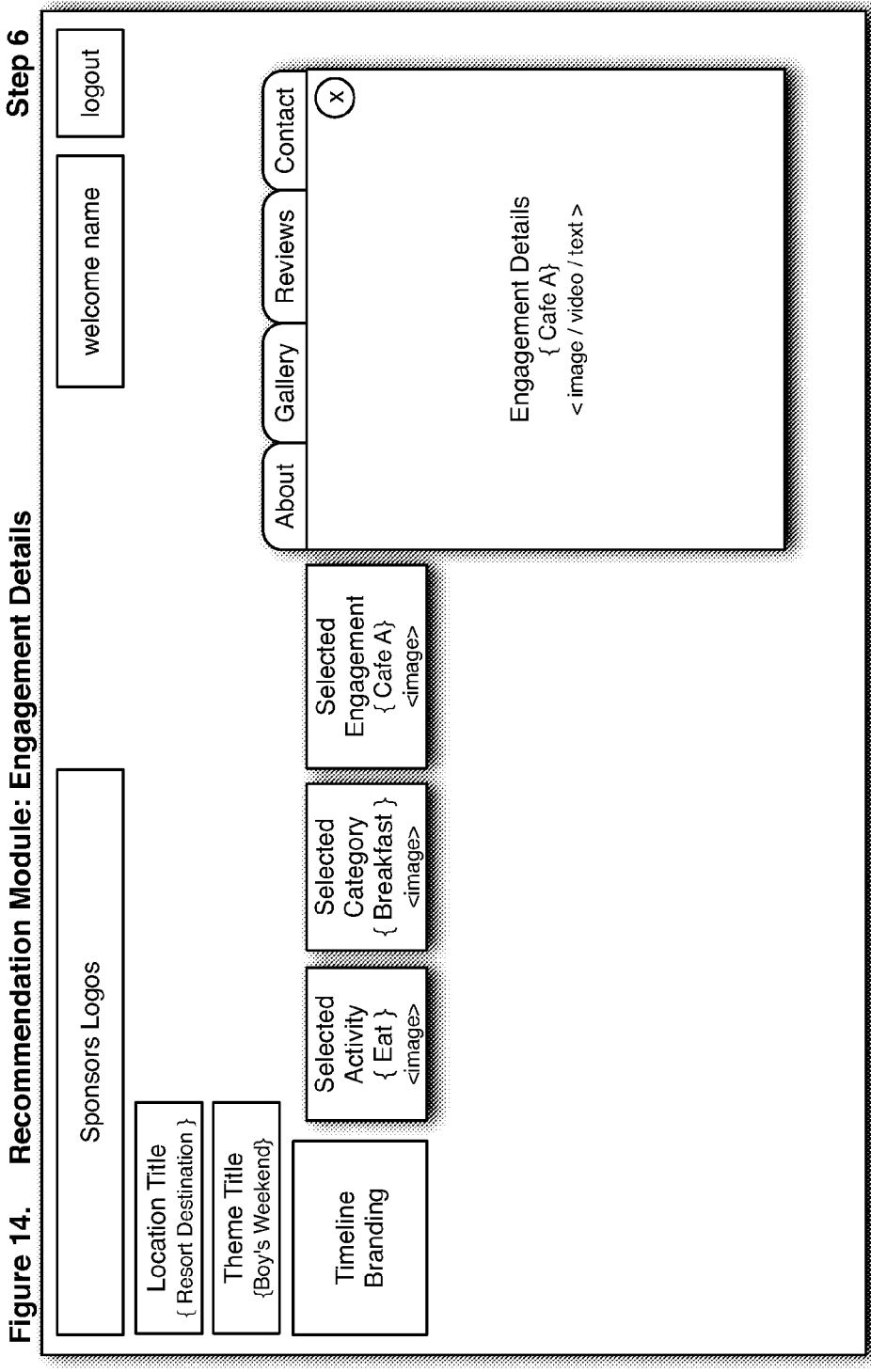
Figure 14. Recommendation Module: Engagement Details

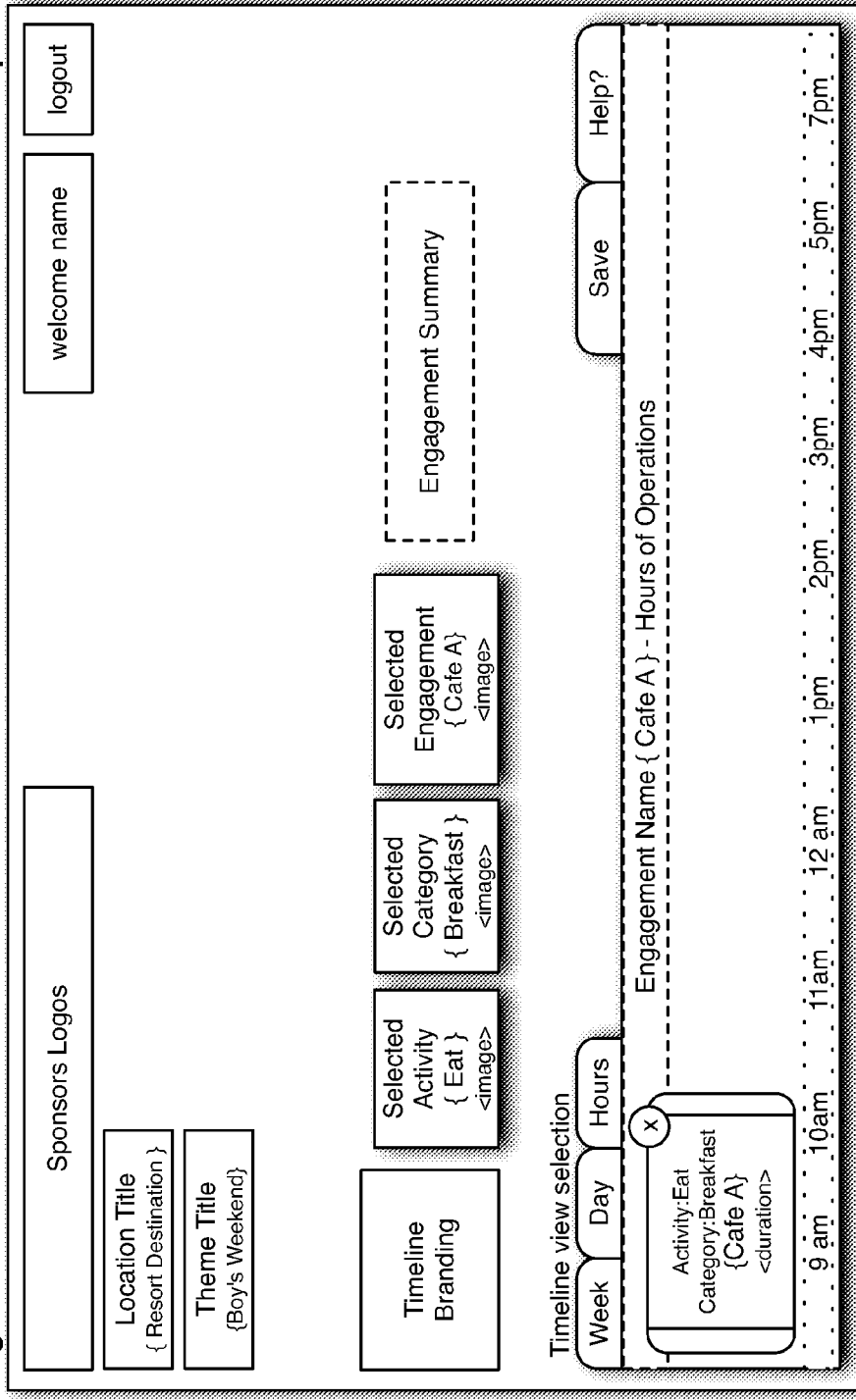
Figure 15. Timeline Module

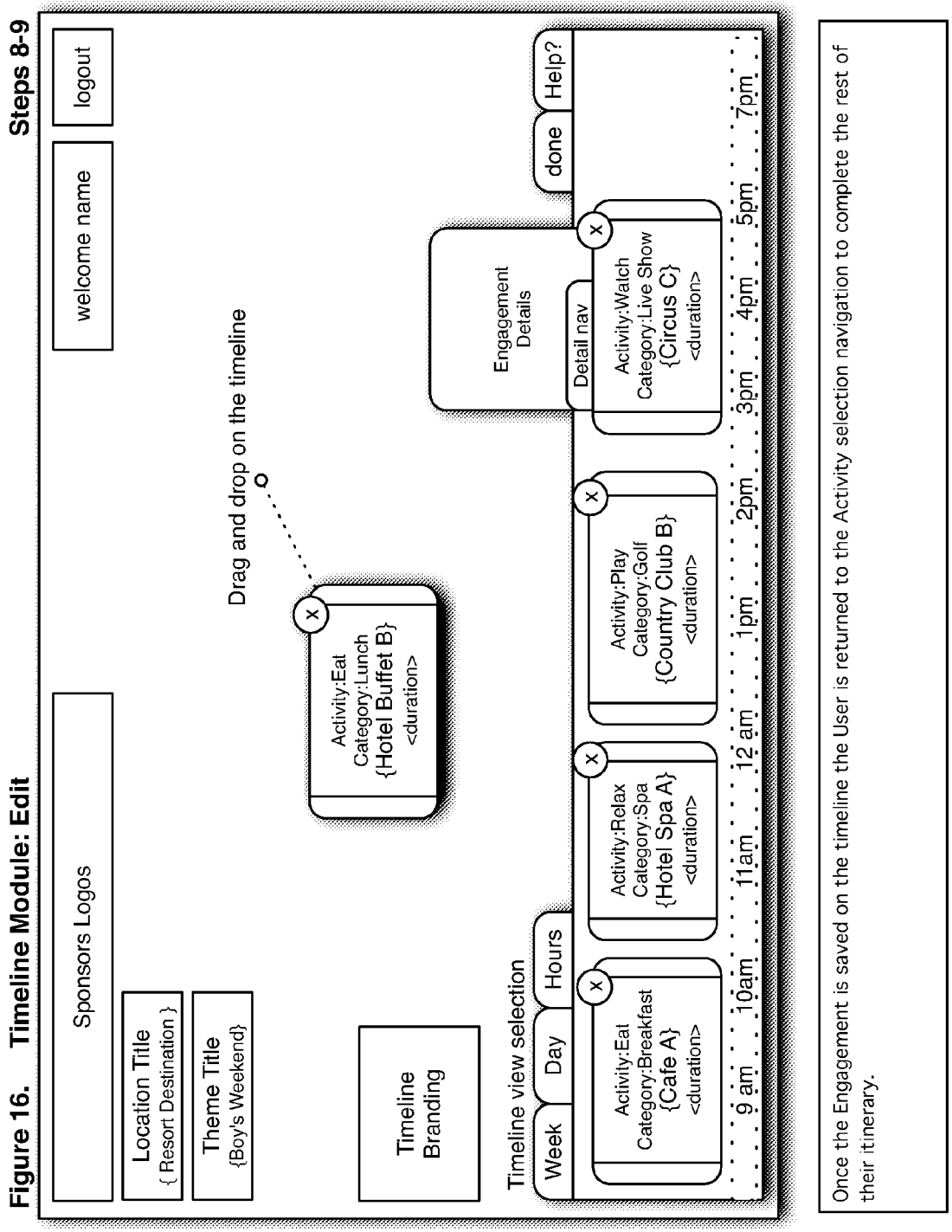

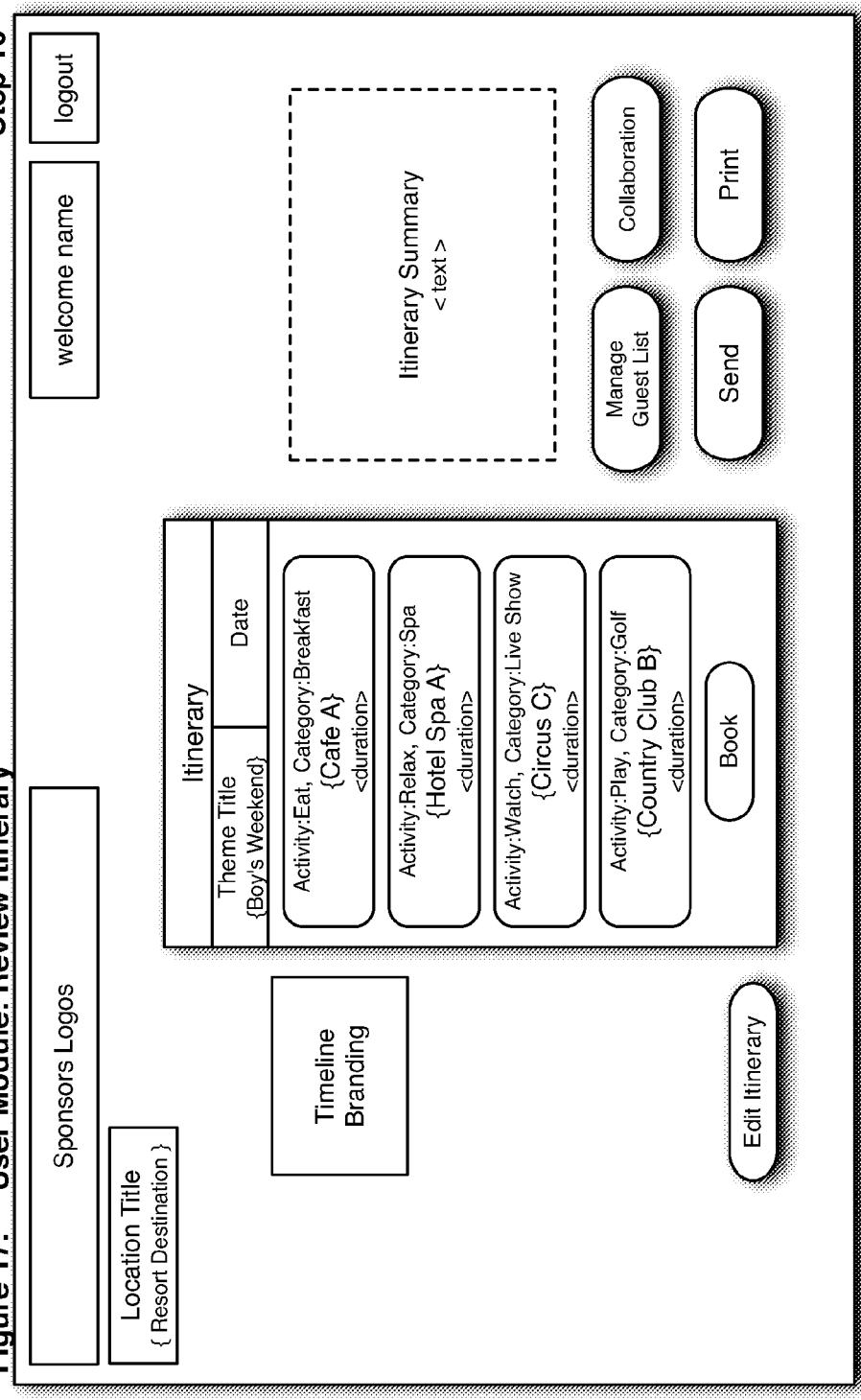
Figure 17. User Module: Review Itinerary
The User Reviews Itinerary. The User has the option to send, print, Collaboration and set-up Guest options. The User clicks to book the itinerary.

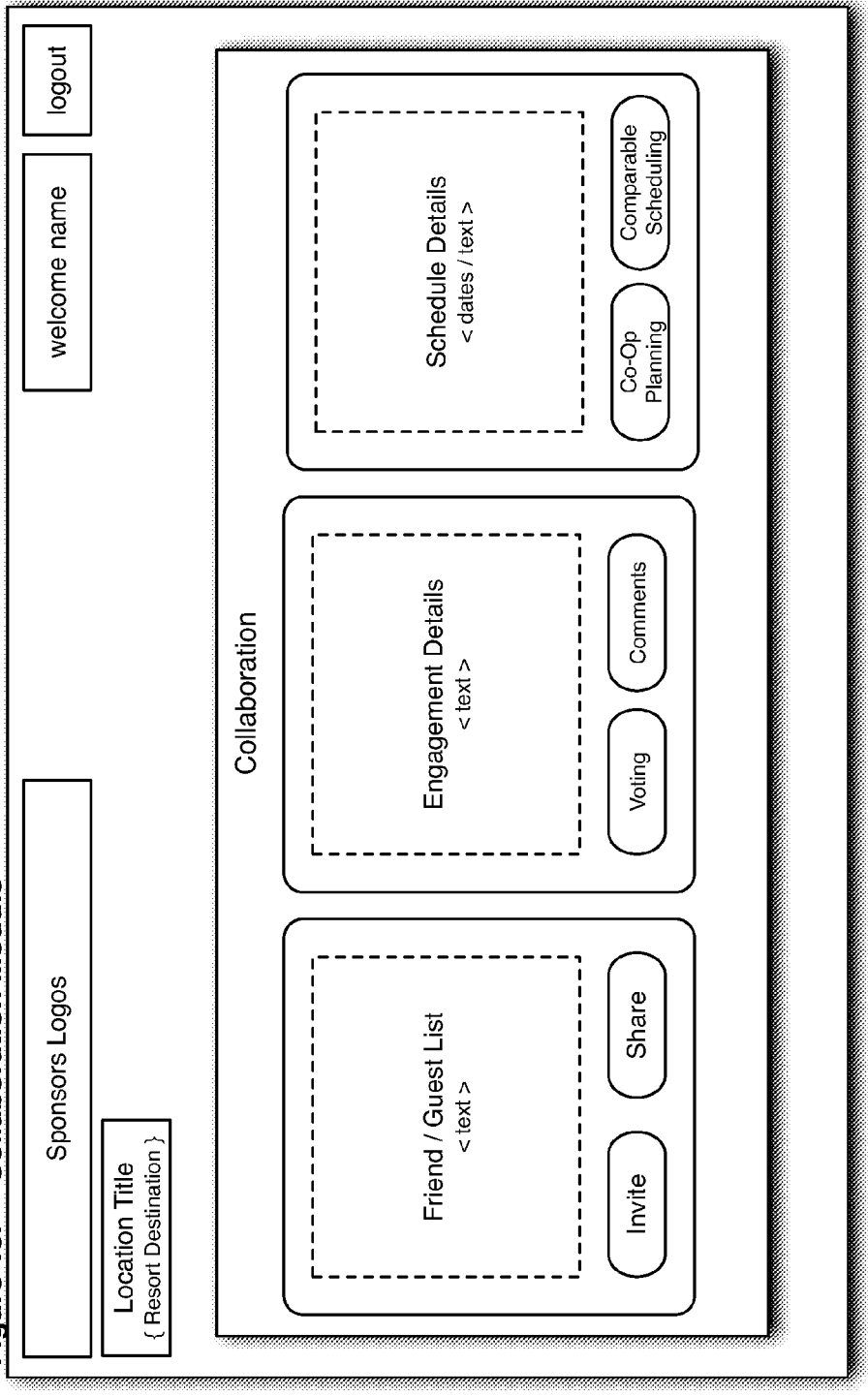

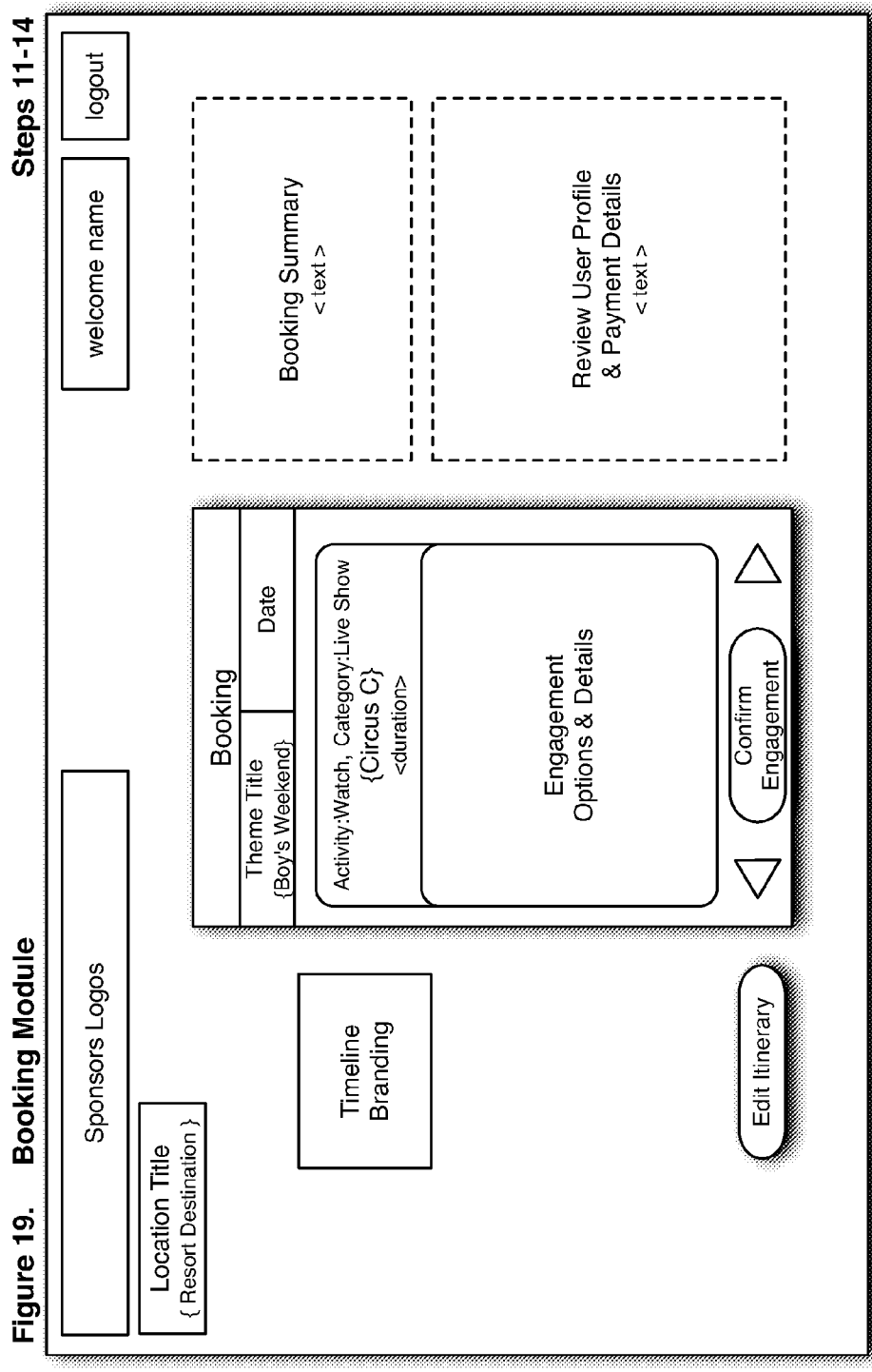
Figure 19. Booking Module
The Booking Module displays the Engagements the user has selected and groups them by vendor type. The User views the Engagement options, details, and books the Engagement.

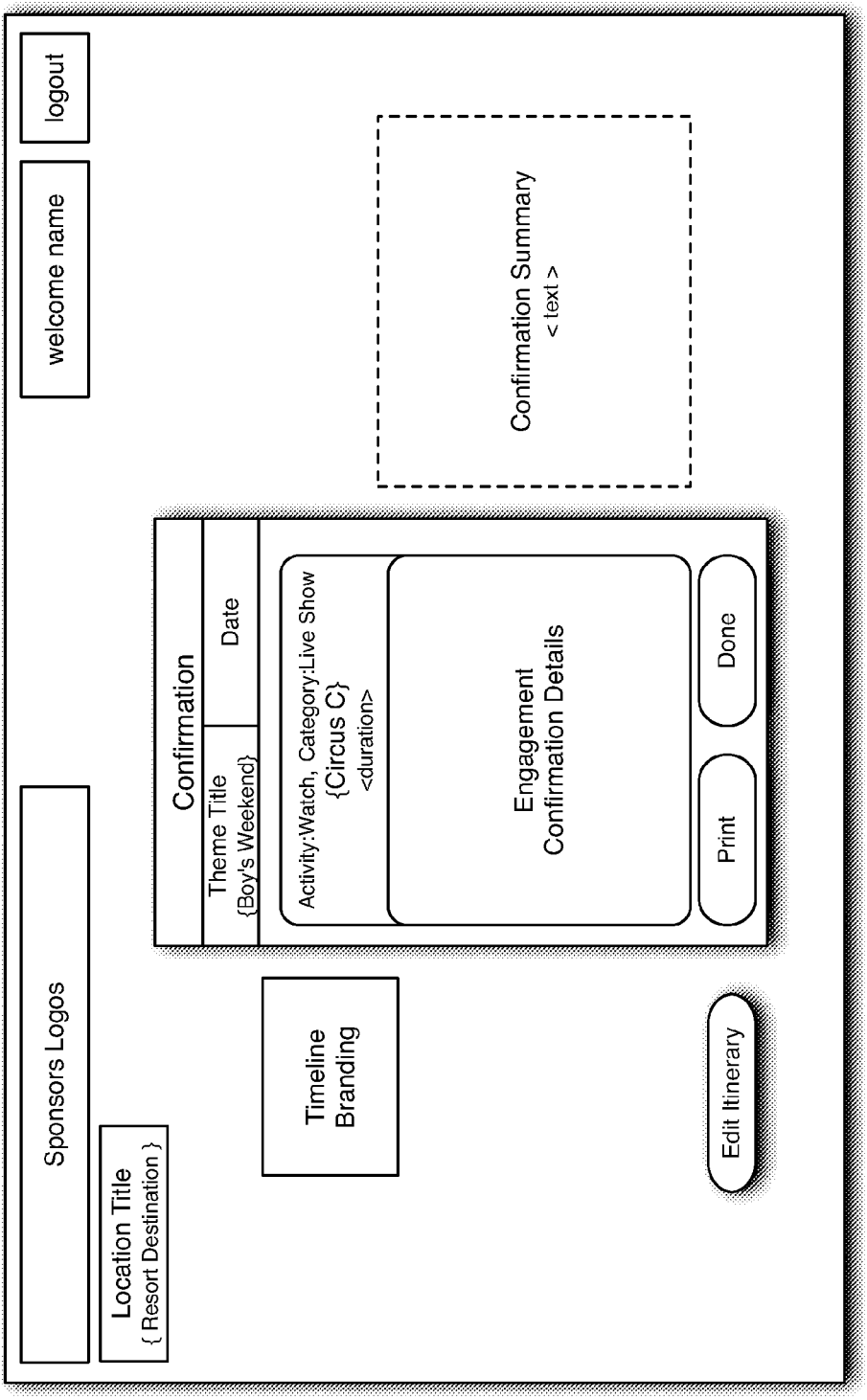

INTERACTIVE ACTIVITY MANAGEMENT SYSTEM AND METHOD

This application is a utility patent application based on, incorporates by reference and claims the benefit of priority of U.S. provisional patent application 61/338,304, filed Feb. 16, 2010.

FIELD OF INVENTION

Described herein are systems and methods that relate generally to defining, booking and managing activities or services by a user through digital computer implemented applications and interactive displays based on time, location and theme.

BACKGROUND

Many destination resorts, theme parks, hotels and other facilities typically include numerous restaurants, entertainment and educational venues for their guests. Advertisements for these various activities are typically provided via various media with information only capability. Additionally, such advertisements also typically contain promotional materials for activities off of the resort site, and supplied by outside vendors. Guests of such resorts and theme parks typically have to create and then write down or input into their personal data assistants, laptop computer, etc., their own timelines for scheduling various activities by accessing various advertisements. This is a relatively cumbersome exercise, and does not enhance the probabilities of the guest remaining on-site at all times during the guest's stay at the location and using only the property's facilities or activities.

SUMMARY

The systems and methods described herein provide an interactive system that enables a user to create a timeline of activities chosen from a menu of pre-designated activities. Preferably the system is an interactive, Internet based system that communicates interactively with users who are guests of the resort via a digital interface, such as a network enabled television in a user's room or via the Web through an online application. The system provides the capability of selecting a variety of themes, activities, engagements and time availabilities to facilitate the user's itinerary for their stay at the location. The user can collaborate with friends, family members or other guests in selecting and booking particular activities and times for the activities. The system also provides for booking of the chosen activity and engagements while the user is online. This makes for a much more efficient system of management and increases the probability that a user will engage and reserve activities at the property for their stay.

These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the accompanying drawings, wherein:

FIG. 8 is a block diagram illustrating a preferred, user start module for the FIGS. 1-4 embodiment;

FIG. 9 is a block diagram illustrating a preferred recommendation module, location selection for the FIGS. 1-4 embodiment;

FIG. 10 is a block diagram illustrating a preferred recommendation module, theme selection for the FIGS. 1-4 embodiment;

FIG. 11 is a block diagram illustrating a preferred recommendation module, activity selection for the FIGS. 1-4 embodiment;

FIG. 12 is a block diagram illustrating a preferred recommendation module, category selection for the FIGS. 1-4 embodiment;

FIG. 13 is a block diagram illustrating a preferred recommendation module, engagement selection for the FIGS. 1-4 embodiment;

FIG. 14 is a block diagram illustrating a preferred recommendation module, engagement details selection for the FIGS. 1-4 embodiment;

FIG. 15 is a block diagram illustrating a preferred timeline module for the FIGS. 1-4 embodiment;

FIG. 16 is a block diagram illustrating a preferred timeline module, edit, for the FIGS. 1-4 embodiment;

FIG. 17 is a block diagram illustrating a preferred user module, review itinerary for the FIGS. 1-4 embodiment;

FIG. 18 is a block diagram illustrating a preferred collaboration module for the FIGS. 1-4 embodiment;

FIG. 19 is a block diagram illustrating a preferred booking module for the FIGS. 1-4 embodiment; and, FIG. 20 is a block diagram illustrating a preferred booking module, confirmation, for the FIGS. 1-4 embodiment;

Figure 1:
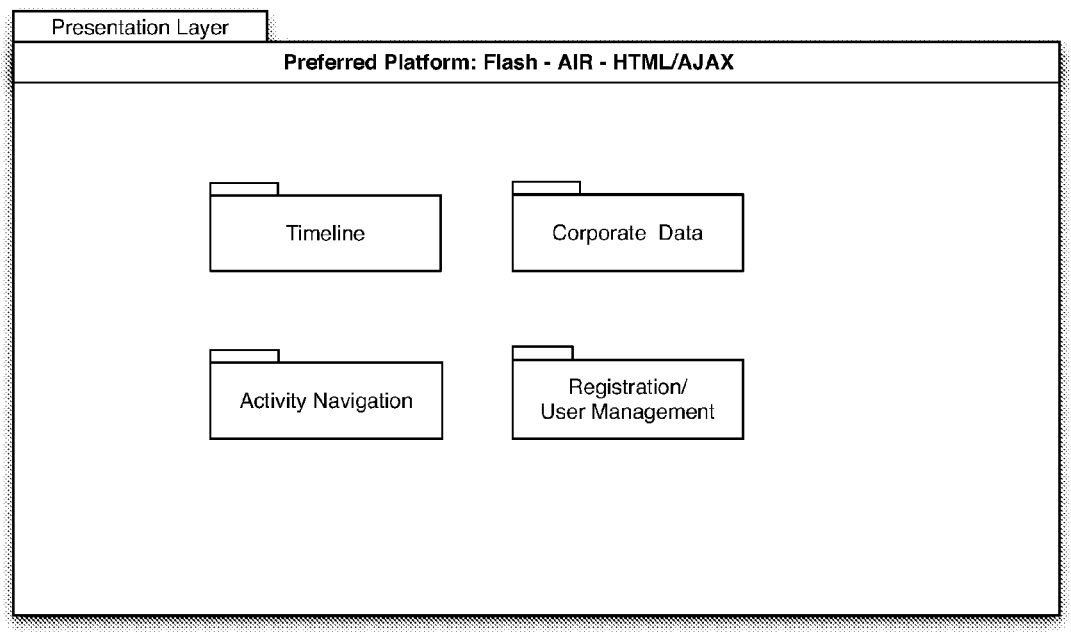
FIG. 1 is a block diagram illustrating a presentation layer for system architecture of a preferred embodiment interactive activity management system and method.

Reference symbols or names are used in the figures to indicate certain components, aspects or features shown therein. Reference symbols common to more than one Figure indicate like components, aspects or features shown therein.

DETAILED DESCRIPTION

In accordance with the description and figures herein various embodiments of a system and method for defining, booking and managing activities or services by a user of digital computer implemented applications and interactive displays based on time, location and theme as related to the user's local environment will be explained.

In a preferred embodiment the present system is intended for use in a specific environment or location, such as a theme park, a resort, a hotel, or specified geographical area such as a resort community, city, or other designated area. The system is preferably an interactive, electronic digital system that includes a processor; a display such as a monitor; input devices such as a keypad, graphical user interface (GUI) or pointing device such as mouse; interactive communication with a global or local network; and an application, a preferred embodiment of which will be described. Specifically, in the instance of the environment being a theme park or resort hotel, the system would assist a guest in planning his, her or group activities as organized about a timeline and various activities such as restaurants, entertainment programs, educational programs, etc.

The system could be installed in a local network server, residing for example at a theme part, or could be installed at a remote server and made available via the Internet as a "software as service" (SAS) application. During operation, the user would have access to the system, typically via a computer or interactive television in the user's room, and once logged onto the system, the user would be presented with a menu of themes, activities, etc., and a timeline displayed on the screen to assist the user in planning activities for a given period along the timeline, such as planning a day's activities in a given 24-hour period. The user then navigates, using a pointing device, such as a mouse, to identify specific themes, activities, etc. of interest. Once a specific activity is chosen, for example, dinner at a particular resort restaurant, the system would then permit the user to select a time for dining, book a reservation at a particular time, and record and display that specific activity on the timeline. Optionally, the system would permit the user to share the activity planning with friends or other guests, and collaborate so that groups of users could join in planning activities.

The following description is made with respect to the figures and supplements the information provided in the written description and conventional symbols contained in captions, text boxes and drawing symbols found in the drawings, all of which are intended to inform a person of ordinary skill in this field of the system capabilities and functions. In that regard it is believed that the combined text and illustration provided herein enable a person of ordinary skill in this field to make and use a system that would successfully function as an interactive activity management system for the purposes intended by the inventors.

System Architecture

Figure 2:
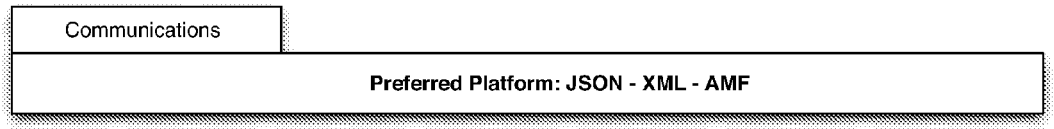
FIG. 2 is a block diagram illustrating a network services layer for the FIG. 1 system architecture.
Figure 3:
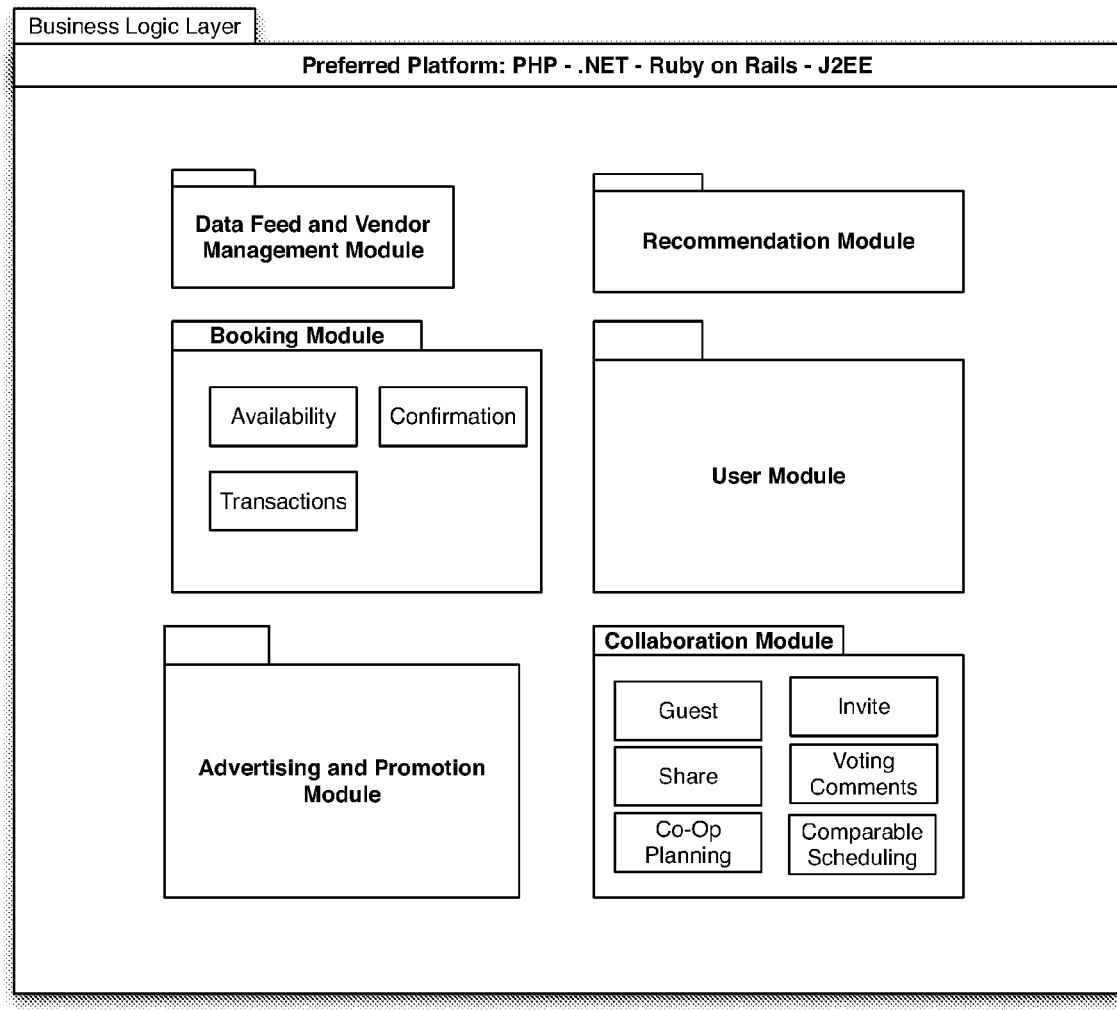
FIG. 3 is a block diagram illustrating a business logic layer for the FIG. 1 system architecture.
Figure 4:
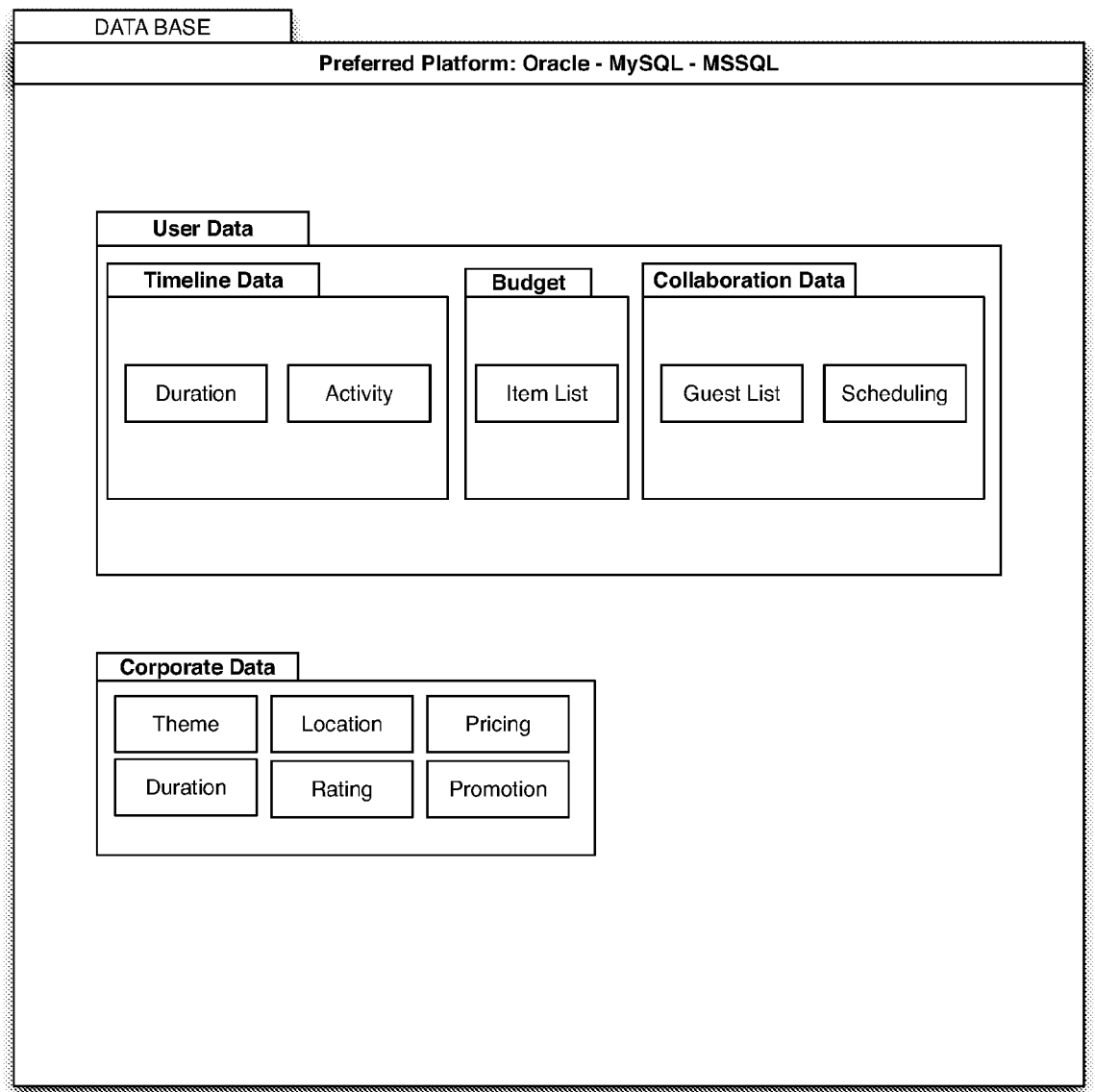
FIG. 4 is a block diagram illustrating a database layer for the FIG. 1 system architecture.

Referring to FIGS. 1-4, preferred embodiment architecture includes a presentation layer as shown in FIG. 1, that includes, for example a timeline, corporate data for the location or environment, activity navigation and registration/user management functions. The presentation layer may be built using conventional techniques and conventional platforms, with Flash/AIR and dynamic HTML/AJAX/JavaScript being preferred platforms. Referring to FIG. 2, a communications platform is provided, with JSON, XML or other methods of bundling data together to be transmitted, e.g., AMF being preferred platforms. As shown in FIG. 3, a business layer is the core of the system, with preferred platforms being PHP, .NET, Ruby on Rails or J2EE. As shown in FIG. 3, a preferred business layer includes a module for data feed and vendor material, with data feed referring to input of data from other information technology (IT) systems; a booking module, an advertising and promotion module, a recommendation module, a user module and a collaboration module, as will be explained in greater detail. As illustrated in FIG. 4, the preferred system includes a database; preferably using a conventional platform with Oracle, MySQL or MSSQL being preferred. The database includes information specific to the user and information specific to the environment host, such as the corporate owner of the theme part in which the system is operating. As illustrated in FIG. 4, typical user data would include timeline data, budget data and collaboration data. Typical corporate data would include theme, duration, location, rating, pricing and promotional data.

User Activity Flow Chart

Figure 5:
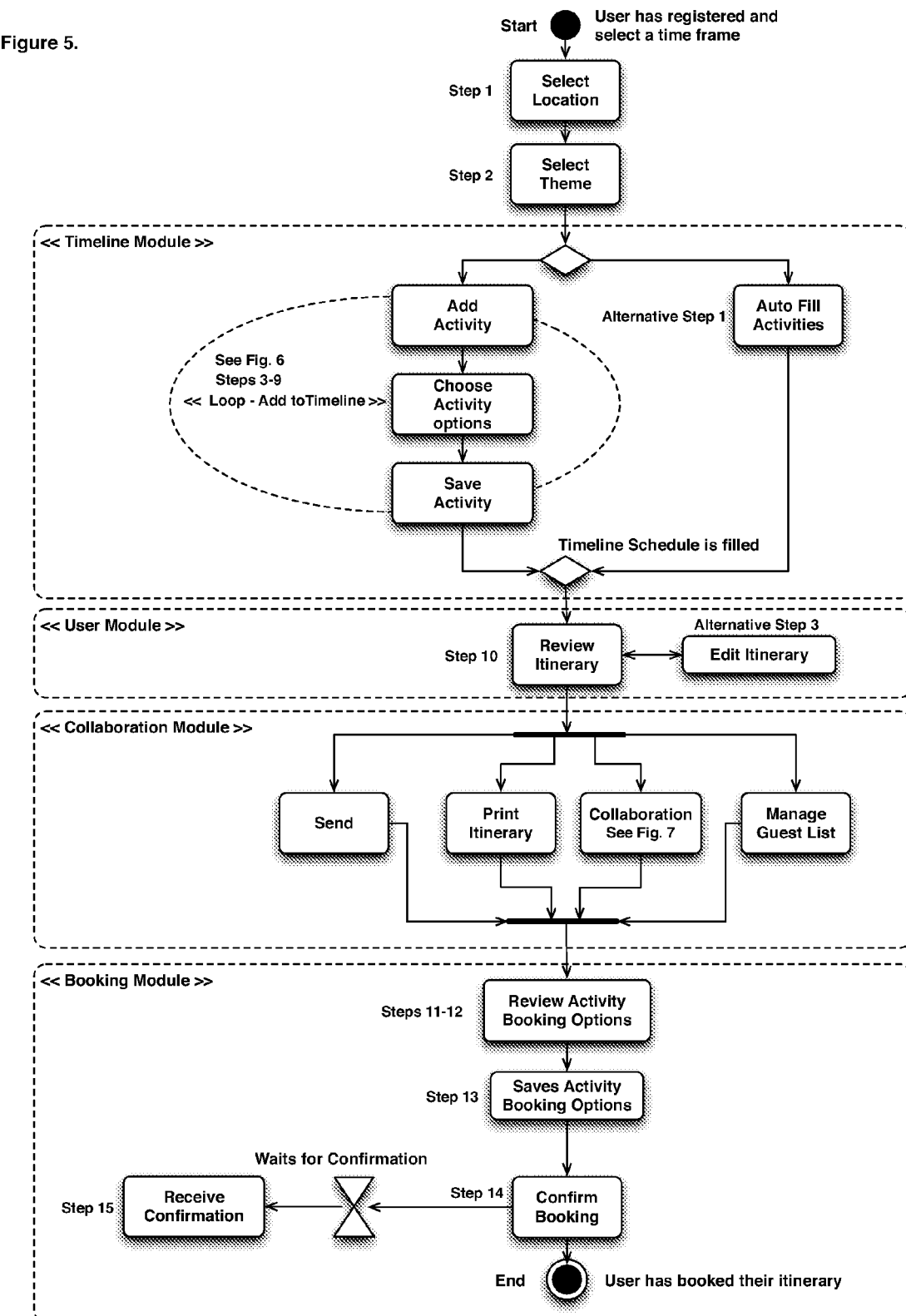
FIG. 5 is a flow chart illustrating overall user activity on the preferred embodiment having the architecture of FIGS. 1-4.
Figure 6:
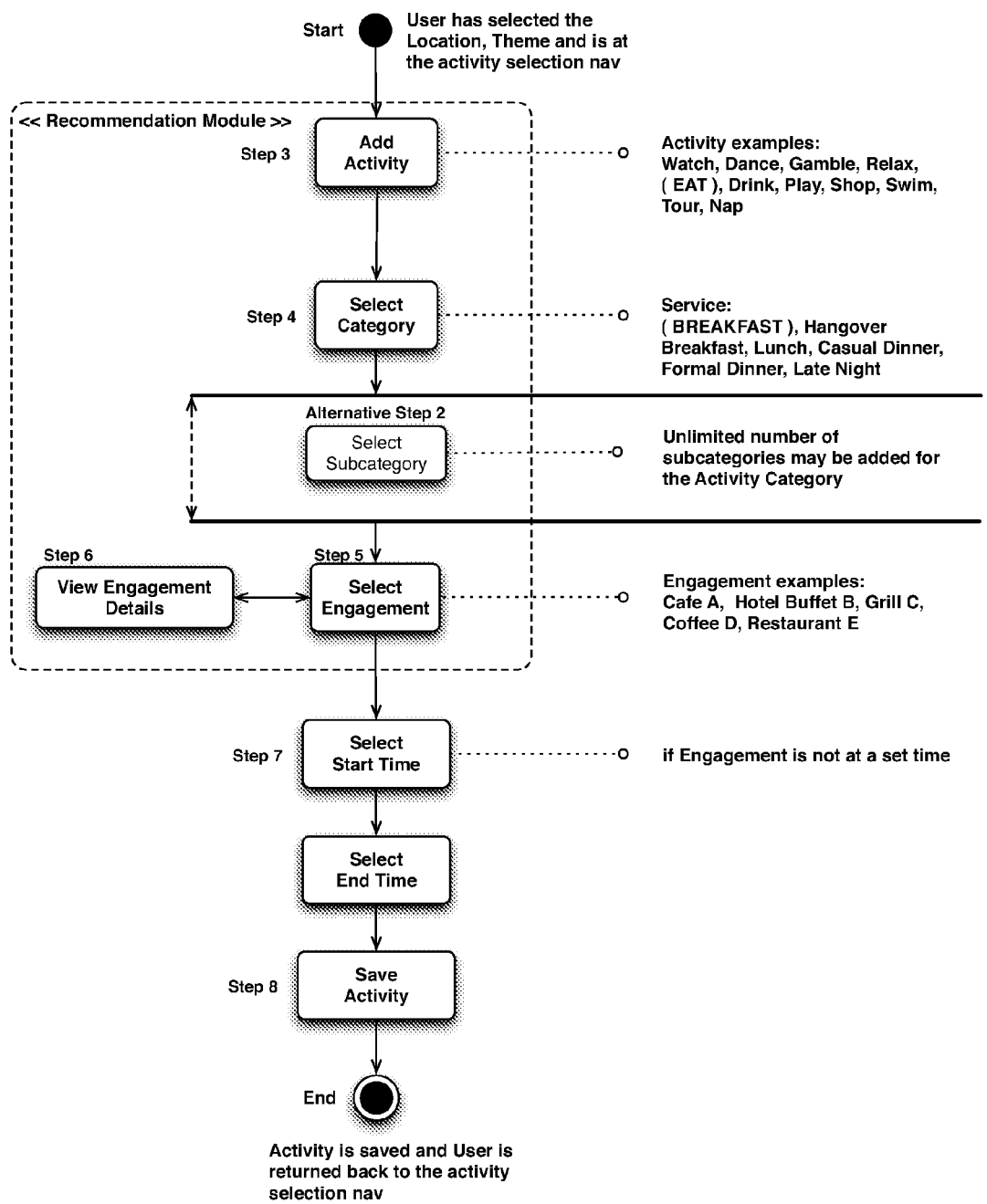
FIG. 6 is a flow chart illustrating a preferred user activity selection module of the FIG. 5 flow chart.
Figure 7:
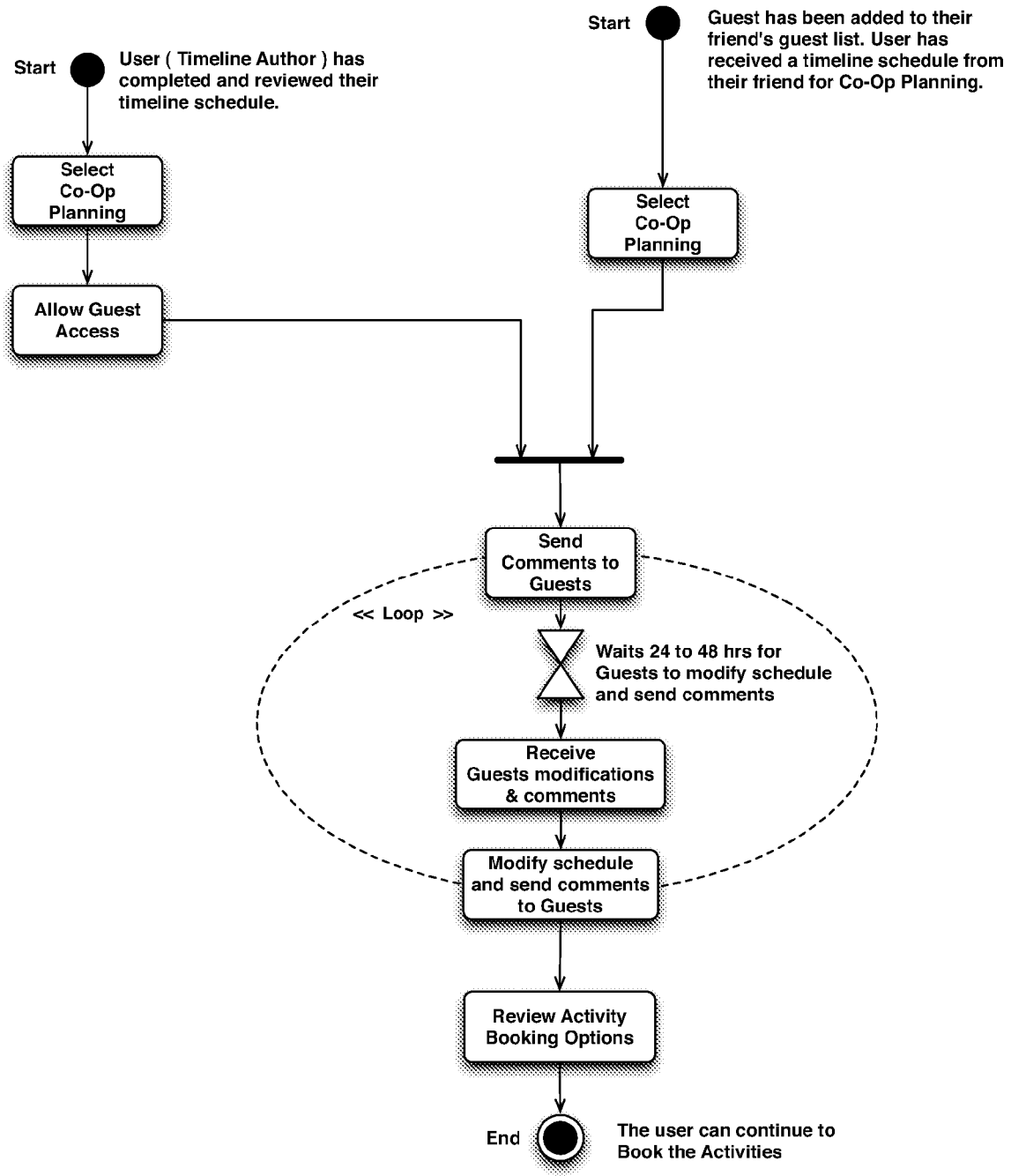
FIG. 7 is a flow chart illustrating a preferred collaboration module of the FIG. 5 flow chart.

Referring to FIGS. 5-7 a flowchart of user activity on a site using the architecture of FIGS. 1-4 will be described in the context of a user who is a guest of a theme park hotel or a resort hotel having numerous activities, restaurants and other venues on site. As shown in FIG. 5, the start condition refers to a first-time user (who may be a repeat user of the hotel) of the system, has registered at the hotel, been assigned an access code, logged on to the system and has selected a time frame, typically a 24-hour period during the user's stay at the hotel. The user navigates through the system, using information on the display to select a location, step 1 and a theme, step 2. The system presents a timeline module with activities and choices as shown in the timeline module of FIG. 5 and the activity module of FIG. 6.

Once the user fills the selected time frame with activities, the system advances to the user module so that the user can review the chosen itinerary and/or edit the itinerary. Once the user is satisfied with his/her itinerary, the system advances to the collaboration module, permitting a second user to collaborate with the first user as detailed in FIG. 7. The system is scalable to accommodate collaboration between more than two guests. For convenience, FIG. 7 describes and illustrates this collaboration. Once the collaboration is complete, the chosen activities are displayed along the time line, providing options for reserving and booking, as shown at the bottom of the collaboration module of FIG. 5 and the bottom of FIG. 7.

Referring again to FIG. 5, the system permits a review of chosen activities at step 11, and displays booking options at step 12. These are stored in the database at step 13, and the user request confirmation of booking at step 14. Next, the user waits for confirmation indicated as a transition from step 14 to the step 15 receipt of confirmation of booking shown in FIG. 5. Once the user has booked the chosen itinerary, the user then ends the session, shown at the bottom of FIG. 5.

Method of Use and Operation of a Preferred Embodiment System—User Case Scenario

With reference to FIGS. 8-20, a specific use case scenario will be used to describe the method of use and operation of the preferred system. While this scenario is presented in regard to a single user with a single activity selection, many users, many environments, many themes, many activities and many other options are readily available choices that could be included in the system and its operation, as will be appreciated by one of ordinary skill in this field.

Consider the primary actor, or user, to be a 32-year old male, resort hotel return consumer user who wants to book activities at the hotel. In this example the user is registered and signed-in. This is the user's second timeline project. He has set the time frame to 24-hours and added his friends to the guest list. For the purpose of this system, a timeline is a visual representation of a series of events and their relationship within a specified period of time, such as a 24-hour period. The system herein described is capable of scheduling and visually representing a series of events across any time frame from a few hours to several years.

As indicated in FIG. 8, various logos for the resort hotel, timeline branding and a summary of activities and venues would be displayed on the start module screen. The user's objective is to define and book a schedule of relevant activities/services for himself and/or guest(s) based on a time, location, and theme. In a successful experience the user has defined a schedule of activities, his friends and guests are aware of the schedule, and he has booked their engagements. To accomplish the objective, the user performs steps 1-9 to select a specific activity, and repeats several of those steps as necessary to select as many activities as desired for a chosen period or timeline. Examples of generic screen displays corresponding to these steps are shown in FIGS. 9-15.

Referring to FIG. 9, the user selects a location from the navigation. For example, out of a menu of several locations the location the user selects is "Las Vegas." The selected location is saved, the title is displayed and the theme selection navigation transitions in to the display.

Referring to FIG. 10, from a listing of several themes, the user selects a theme from the navigation. For example, the theme the user selects is "Boy's Weekend." The selected theme is saved, the title is displayed and the activity selection navigation transitions onto the display.

As shown in FIG. 11, from a number of activities available, the user selects "Eat" from the activity selection navigation. The selected activity is saved and added to the visual navigation bar. Next, the category selection navigation transitions in to the display.

Referring to FIG. 12, of several available categories, the user select "Breakfast" from the category selection navigation. The selected category is saved and added to the visual navigation bar. Next, the engagement selection navigation transitions in to the display.

Next, as illustrated in FIG. 13, of several restaurants open for breakfast at the resort during a period when the user wants to eat breakfast, the user selects "Cafe A" from the engagement selection navigation. The selected engagement is saved and added to the visual navigation bar. As shown in FIG. 14, the user then clicks to view the engagement details page for Café A. The details page includes information about Café A, its services, as well as gallery, video and contact information.

As shown in FIG. 15 the timeline selected by the user at the beginning of the session is shown at the bottom of the screen display. The user adds the engagement to the timeline at the time he wants to have breakfast, using the drag and drop process. The engagement can only be added to the timeline at the available times defined in the hours of service. The user can adjust the start and end time of the engagement if the time is not predefined.

As shown in FIG. 16, the user clicks to save first engagement. The first engagement is saved on the timeline and the user is returned to the activity selection navigation to complete the rest of his itinerary. The user repeats steps 3-8 to select and save his chosen engagements until the schedule is filled.

Next as shown in FIG. 17, step 10, the user reviews his selected itinerary. The user has the option to send, print, and collaborate and set-up guest options. The user has the option to share his itinerary with friends who he has entered on his system guest list. This function enables other users to have access to the itinerary and make modifications or suggestions. The guests can also, for example, vote and comment on each activity and engagement as illustrated in FIG. 18.

Referring to FIGS. 19-20, steps 11-15, the user clicks to book the itinerary. The booking module displays the engagements the user has selected and groups them by vendor type. The user views the engagement options and details, then selects and saves the engagement options. Next the user clicks to confirm and book each engagement. The user receives confirmation from each engagement vendor. The user repeats step 12 until he has booked and received confirmations for all of his selected engagements.

Additional Alternate Embodiments

Once the theme is selected in the main scenario, step 2, the user has the option to have the system automatically fill in accompanying activities by clicking "auto fill activities". In this option the user's timeline schedule is populated with prepackaged activities. Once populated, the system then continues to main scenario step 10.

The system displays an optional subcategory menu after the category selection navigation at main scenario step 4. With this option the user selects an item from the subcategory selection navigation. The selected subcategory is added to the visual navigation bar. Engagement selection navigation transitions in. After engagement selection is complete for that subcategory, the system continues to main scenario step 5.

Also, another option is provided such that, after the user reviews the itinerary in main scenario step 10, the user can click to edit the timeline schedule, and can remove or add activities on the timeline.

In another use case scenario, the present system is adapted to provide an online, concierge-like experience or capability for a theme park. In this scenario, a large theme park with hotels provides the system within guest rooms on an interactive television or via a network connection that can be accessed through a guest's computer or other electronic device. The system logon screen would have images of the theme park as a background, the ability for the user to read about the park and use of the system and convention logon functionality. The recommendation theme display could include, for example selections such as "family vacation", "couples' getaway", "girls' trip", "boys' weekend", "school trip", "corporate meeting" and "friends' group" with the same or different background imagery. The recommendation activity module could include, for example, selections such as "call", "ride", "eat and drink", "watch", "relax", "relax", "play", "shop", "swim", "special events" and "sleep" with the same or different background image(s). In the event the user chose the "watch" activity, then a series of activity categories would be displayed and could include, for example, "fireworks", "shows", "parades", etc. In the event the "parades" category was chosen, then a list of the various parades available would be presented on the display such as a holiday theme parade, a parade featuring magic, a parade featuring seasonal themes, a block party type theme, etc.

In the event the activity "relax" was chosen, a selection of relaxation types such as "spa", is presented and can include spa engagements at various venues, such as at the various hotels located at or near the theme park. At this level, the preselected timeline will appear on the display, and provide the user with the opportunity to choose a particular engagement and assign it to a specific start and end time on the timeline. For example, in the event a spa treatment at a yacht-themed hotel was chosen, the hours of operation will be displayed on the timeline, and the user is provided with the opportunity to select start and stop times during the spa's hours of operation. In the event that the user has previously selected other engagements with the system, those engagements would be displayed on the timeline, to indicate to the user that those blocks of time have already been filled.

Similarly, in the event the user chose the "eat and drink" category, then a list of restaurants would be displayed so that the user can learn about them, their hours of operation and then select a particular restaurant at a particular time consistent with other choices that may have been made by the user and displayed on the timeline. In the event the user chose the "ride" category, then a list of the theme park's rides would be displayed, and the user could then click on rides, such as roller coaster, simulated space trips, adventure rides, etc., to learn about them and their hours of operation. Once a ride is chosen, the user could then elect a particular ride and a particular time consistent with other choices that the user may have previously made and would then be displayed on the engagement screen display.

Once the user has made all of the selections and wants to review those choices, he clicks the "review itinerary" option and the system displays a summary of the choices made. For example, in the event the user chose "family vacation" and made engagements spanning a two-day period, then the screen display would list all of those engagements, in a two-day presentation, with start and end times for each engagements. This gives the user the ability to see his planned vacation in context and the engagement time relationships, each to the other. The display would also provide options for sending the itinerary, saving the itinerary, printing it, adding or changing guests, etc. Finally, the user could then click to the booking module, and book the selected engagements.

Although specific embodiments of the system and general method have been described, various modifications, alterations, alternative constructions, and equivalents are also encompassed within the scope of the invention. The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. An interactive, Internet based system for managing resort guest activities based on time, location and theme comprising:
   a processor connected to a network and operatively and interactively connected to a user workstation including a visual display and an input device from the group consisting of a pointing device, a keypad and a graphical user interface;
   said processor including one or more resident applications that include a presentation layer, a web services layer, a business logic layer and a database adapted to cooperate with each other, adapted to provide on the display a pre-determined timeline and adapted to permit the user to
   (a) select a time frame to create a selected time frame;
   (b) select a theme to create a selected theme;
   (c) select from said display an activity from a menu containing a plurality of activities within said selected theme to define a selected activity;
   (d) select from said display a category from a menu containing a plurality of categories of said selected activity to define a selected category;
   (e) select from said display an engagement from a menu containing a plurality of engagements within said category to define a selected engagement;
   (f) select from said display a start time from a menu containing a plurality of start times for said selected engagement and;
   (g) select from said display an end time from a menu containing a plurality of end times for said selected engagement;
   (h) place on said timeline on said display a representation of said selected engagement corresponding to said start time and to said end time;
   (i) save said selected engagement in said database;
   (j) review the selected engagement;
   (k) edit from the display the selected engagement; and,
   (l) book from the display the selected engagement to create a user itinerary for said selected time frame.

2. The system of claim 1 wherein said applications further adapted to permit said user to collaborate with another user in steps (a)-(h).

3. The system of claim 1 wherein said time frame is a 24-hour period.

4. The system of claim 1 further adapted to permit the user to collaborate with a second user in selecting a theme.

5. The system of claim 1 further adapted to permit the user to collaborate with a second user in selecting an activity.

6. The system of claim 1 further adapted to permit the user to collaborate with a second user in selecting a category.

7. The system of claim 1 further adapted to permit the user to collaborate with a second user in selecting an engagement.

8. The system of claim 1 further adapted to permit the user to collaborate with a second user in selecting a start time.

9. The system of claim 1 further adapted to permit the user to collaborate with a second user in selecting an end time.

10. The system of claim 1 further adapted to permit the user to collaborate with a second user in selecting a theme.

11. The system of claim 10 further adapted to permit the user to collaborate with a second user in selecting an activity of said theme.

12. The system of claim 11 further adapted to permit the user to collaborate with a second user in selecting a category of said activity of said theme.

13. The system of claim 12 further adapted to permit the user to collaborate with a second user in selecting an engagement of said category of said activity of said theme.

14. The system of claim 13 further adapted to permit the user to collaborate with a second user in selecting a start time for said engagement of said category of said activity of said theme.

15. The system of claim 14 further adapted to permit the user to collaborate with a second user in selecting a start time for said engagement of said category of said activity of said theme.

16. The system of claim 14 further adapted to permit the user to collaborate with a second user in selecting an end time for said start time for said engagement of said category of said activity of said theme.

* * * * *